Figure 4:
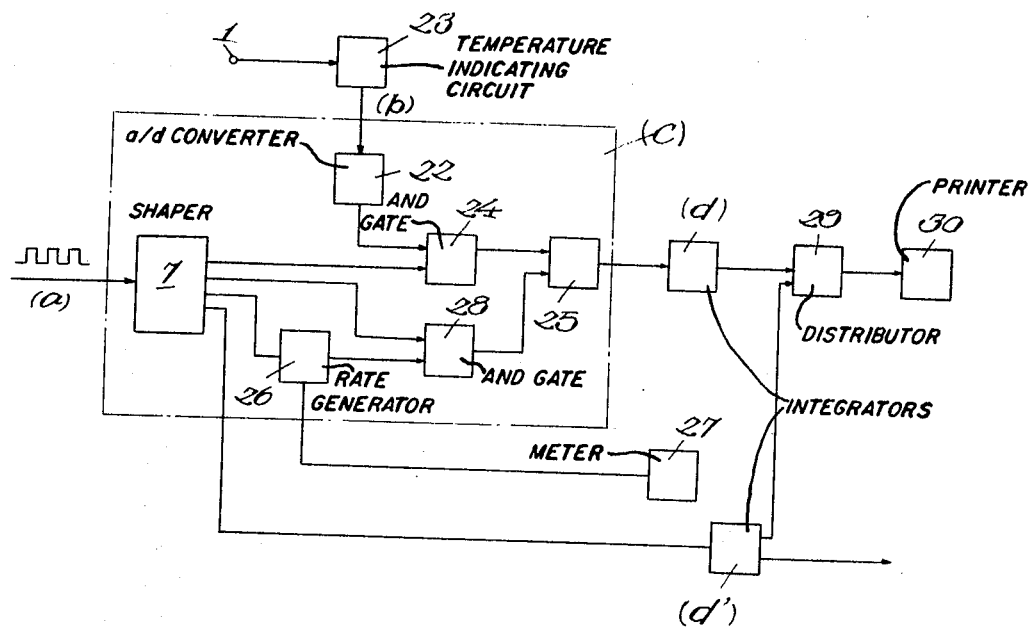

United States Patent

[11] 3,610,898

| [72] | Inventors | Hiroshi Yamamoto;<br>Keiichi Ohashi; Minoru Kanbara, all of Tokyo, Japan |
|---|---|---|
| [21] | Appl. No. | 738,677 |
| [22] | Filed | June 20, 1968 |
| [45] | Patented | Oct. 5, 1971 |
| [73] | Assignee | Oval Kiki Kogyo Kabushiki Kaisha<br>Tokyo, Japan |

[54] SYSTEM FOR CORRECTING EACH UNIT AMOUNT OF A QUANTITY BEING MEASURED AND INTEGRATING CORRECTED VALUES
15 Claims, 4 Drawing Figs.

[52] U.S. Cl. .................................................. 235/151.34, 235/156
[51] Int. Cl. ................................................... G06f 7/38
[50] Field of Search ..................................... 235/151.34, 150.5, 150.52, 194, 195, 196, 156, 151.3

[56] References Cited
UNITED STATES PATENTS

| 3,183,342 | 5/1965 | Wortzman | 235/150.5 X |
| 3,299,258 | 1/1967 | Borsboom et al. | 235/151.34 |
| 3,444,360 | 5/1969 | Swan | 235/150.52 X |
| 3,445,643 | 5/1969 | Schmoock et al. | 235/151.34 X |
| 2,703,386 | 3/1955 | Seney | 235/151.3 X |
| 2,866,332 | 12/1958 | Sherman | 235/151.3 X |
| 2,985,012 | 5/1961 | Wail | 235/151.3 X |
| 3,045,221 | 7/1962 | Roop | 235/151.3 X |
| 3,108,183 | 10/1963 | Ganley et al. | 235/151.3 X |
| 3,162,043 | 12/1964 | Conow et al. | 235/151.3 X |
| 3,471,685 | 10/1969 | Bishop | 235/151.3 X |

*Primary Examiner*—Malcolm A. Morrison
*Assistant Examiner*—Edward J. Wise
*Attorney*—Michael S. Striker

ABSTRACT: Fluid flow is measured and a pulse generated for each unit of fluid. A correction signal, either voltage or a second pulse sequence, is generated to correspond to a correction factor for adjusting the fluid to a standard temperature. A arithmetic circuit furnishes an output pulse sequence which corresponds to the pulse sequence generated by the flow of fluid decreased by a percentage of these pulses corresponding to the correction signal.

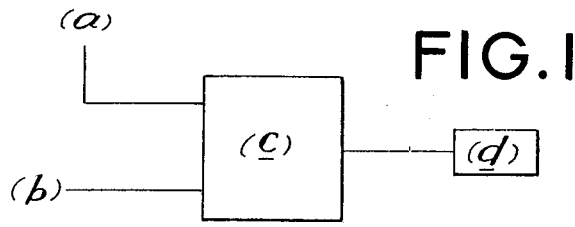
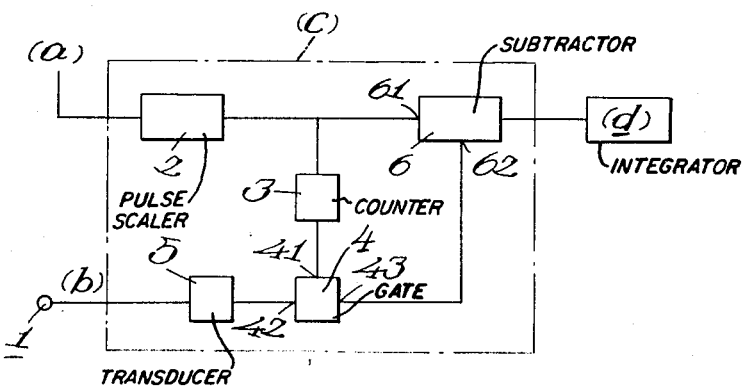
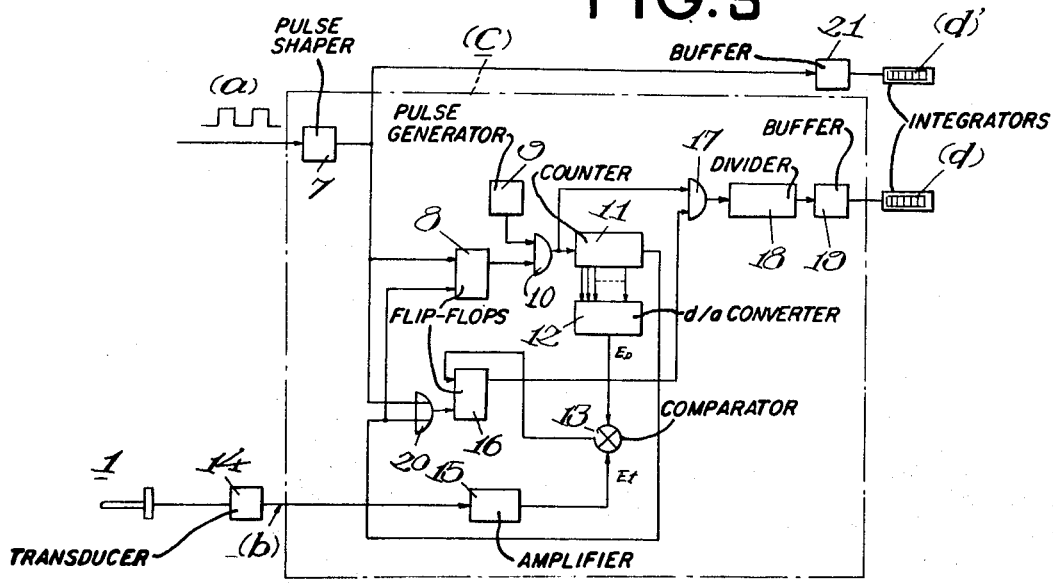

SYSTEM FOR CORRECTING EACH UNIT AMOUNT OF A QUANTITY BEING MEASURED AND INTEGRATING CORRECTED VALUES

The invention relates to a system for correcting a measured quantity for each unit amount thereof and integrating such corrected quantity. It is an object of the invention to provide such system wherein a measured quantity such as flow rate as measured with a volume-type flowmeter, weight as measured with a weighting instrument or other quantities is converted into a series of unit pulses each corresponding to the unit amount of the quantity being measured and such unit pulses are used as gate signals to feed to a corrector device evaluated pulses for a physical conversion coefficient or correction factor of the measured quantity to be corrected so that the corrector device may derive the product (unit quantity measured) ×(physical conversion coefficient)

for each unit amount of the quantity measured, and wherein a sum of such products is formed to integrate the converted or corrected values of the quantity being measured.

It is another object of the invention to provide a system which always operates to correct each unit amount of the quantity being measured to a corresponding value in the standard condition and integrate such standardized values, the manner of correction being such that a product is formed of the quantity being measured and a physical coefficient which is a function of the quantity being measured.

It is still another object of the invention to provide a system for correcting each unit amount of the quantity being measured and integrating such corrected values, the system comprising a unit-pulse emitter for producing a unit pulse for each unit amount of the quantity being measured means for deriving an evaluated pulse of a physical conversion coefficient which is a function of the unit amount of the quantity being measured, a gate circuit opened by each unit pulse from the unit-pulse emitter, and an integrating device for integrating the corrected value of the unit pulse.

It is yet another object of the invention to provide a system for correcting each unit amount of the quantity being measured and integrating such corrected values wherein for a unit pulse emitted for each unit amount of the quantity being measured, a physical conversion coefficient which is a function of the quantity being measured, is converted into a corresponding analogue quantity, which is compared with the analogue conversion of a digital quantity produced by a reference or preset counter that is operated by the unit pulse, so that for each unit pulse emitted, the difference ($No-Nx$) between the number $No$ of pulses fed to the reference counter and the number $Nx$ of pulses passed from the reference counter may be led to a divider circuit which performs the division $$N_r = N \frac{N_0 - N_x}{N_0}$$

where $Nr$ denotes the number of output pulses from the divider and $No'$ a divisor, the divider circuit being connected to a buffer so that a corrected value of each unit amount of the quantity being measured may be obtained therefrom for integration.

It is a still further object of the invention to provide a system for correcting each unit amount of the quantity being measured and integrating such converted values, wherein when there is any change in temperature, during the measurement, of a fluid to be measured, the measured value of fluid temperature and a present coefficient of expansion are used in a relationship between temperature and volume for deriving a volume at a standard temperature so that the integration of corrected unit volume pulses may be effected, and wherein the variation of sensitivity against the speed of flow from a flowmeter to another may be compensated for by detecting the speed of flow from the pulse intervals and relating it to the variation.

It is a yet further object of the invention to provide a system for correcting each unit amount of the quantity being measured and integrating such corrected values which incorporates an integrating meter for direct integration of unit pulses from the flowmeter as well as an integrating meter for integration of corrected values and which is associated with a printer that is operable by operation of a push button to print the reading of the both integrating meters at any given time to provide for the check of the failure of the above mentioned correction mechanism. Above and other objects, features and advantage of the invention will become apparent from the following description of the embodiments thereof shown in the drawing wherein:

FIG. 1 is a schematic block diagram illustrating the fundamental principle of the system according to the invention for correcting each unit amount of the quantity being measured and integrating such corrected values, and FIGS. 2 to 4 are schematic block diagrams of particular arrangements for temperature compensation of flow meter. Referring first to FIG. 1, reference character $a$ denotes a unit pulse emitted for each unit amount of a quantity being measured of any kind, reference character $b$ a unit quantity such as a pulse or an analogue quantity which represents a physical coefficient that is a function of the quantity being measured, reference character C an arithmetic circuit for performing an arithmetic operation on the unit pulse $a$ and unit quantity $b$ with the former being used as a gate signal, and reference character $d$ an integrator for integrating corrected or converted values from the arithmetic circuit.

In the embodiment shown in FIG. 2, the quantity being measured is flow rate from a flowmeter. Unit pulses $a$ which are emitted by a flowmeter and unit quantities $b$ produced by a temperature-sensitive resistor element 1 which is capable of converting a temperature -dependent physical conversion coefficient having a functional relationship with the flow rate of a fluid being measured into a corresponding value at a standard temperature are both introduced into an arithmetic circuit $c$ for calculation of a flow rate at the standard temperature and the converted flow rate is integrated by an integrator $d$.

In the arithmetic circuit $c$, reference numeral 2 denotes a pulse scaler circuit which multiplies the repetition frequency of the unit pulse $a$ by a constant factor. Reference numeral 3 denotes a reference or preset counter which counts the output pulses from the pulse scaler circuit 2 until a predetermined count is reached, whereupon a single output pulse is produced and the counter is reset, Reference numeral 4 denotes a gate circuit which is operated by application of the output pulse from the reference counter 3 at a terminal 41 to allow passage between terminals 42 and 43 for a constant period $\tau$, and reference numeral 5 denotes a voltage-pulse frequency transducer which responds to the unit quantity produced by the temperature-sensitive resistor element in the form of a voltage to generate pulse signals having a repetition frequency proportional to the voltage, the transducer being connected to the input terminal 42. Reference numeral 6 denotes a pulse-subtractor circuit having its one input terminal 61 connected with the output of the pulse scaler circuit 2 and its other input terminal 62 connected with the output of the gate circuit, and this subtractor circuit operates to subtract pulse signals applied to the input terminal 62 from pulse signals applied to the input terminal 61.

Assuming that the unit pulses $a$ emitted for each unit amount of a fluid being measured have a repetition frequency of $f_1$ c/s, the fluid is at a temperature of $t°$ C. and a correction factor $\alpha$ for the fluid being measured, this factor being a constant specific to each fluid being measured and representing a factor which is multiplied to a flow rate measured for its conversion to a volume at a standard temperature $t_o°$ C., the following relationship is established for the desired conversion:

$$f_c = f_1[1 - \alpha(t - t_0)] \qquad \qquad$$
$$= f_1(1 + \alpha t_0) \cdot \left(1 - \frac{\alpha t}{1 + \alpha t_0}\right) \qquad \text{I}$$
$$f_c = f_1(1 + \alpha t_0) \cdot \left(1 - \frac{f t \cdot \tau}{N}\right) \qquad \text{II}$$
$$\frac{f t \cdot \tau}{N} = \frac{\alpha t}{1 + \alpha t_0} \qquad \text{III}$$

where $f_c$ represents the repetition frequency of pulses which represent the flow rate as converted to that at the standard temperature $t_o°$ C. The equation I involves the term $f_1(1+\alpha t t_o)$, which is obtained when the repetition frequency of the unit pulse $a$ is multiplied by a factor $(1+\alpha t_o)$. This is supplied by the pulse scaler circuit 2. It will be appreciated that the scaler circuit 2 can be omitted when $t_o=0$. The term involving $\alpha t/(1+\alpha t_o)$ can be derived by multiplying the output signal of the scaler circuit 2 by the correction factor and the fluid temperature $t$ and dividing the product by $(1+\alpha t_o)$.

In order to carry out this arithmetic operation, the unit quantity produced by the temperature-sensitive resistor element 1 is applied to the voltage-pulse frequency transducer 5 which provides pulse signals of a repetition frequency $f_t$ which is proportional to the fluid temperature, the constant of proportionality being determined by the constant $\alpha/(1+\alpha t_o)$ and a count N in the reference counter 3.

The constant is determined so that pulses may be produced at the output terminal 43 of the gate in a number proportional to the product of the fluid temperature and the correction factor each time when the gate circuit 4 is opened for a period of $\tau$ by application of the output pulse from the reference counter 3 at the input terminal 41 of the gate. Pulse signals appearing at the output terminal 43 of the gate circuit 4 are subtracted in the pulse subtraction circuit 6 from the output pulses supplied by the pulse scaler circuit 2. When the reference counter 3 is preset for a count N which is a constant determined by the circuit arrangement, each time the number of output pulses from the pulse scaler circuit 2 amounts to N, the reference counter 3 generates an output pulse which opens the gate circuit 4 for application to the pulse subtractor circuit 6 of pulse signals of a number proportional to the product $f_t\tau$ of the fluid temperature and the correction factor, such number of pulse signals being subtracted from the output signals from the pulse scaler circuit 2, thereby accomplishing the calculation as represented in the equation I.

Thus there can be obtained at the output terminal of the pulse subtractor circuit 6 pulse signals having a repetition frequency proportional to the flow rate at the standard temperature $t_o°$ C of the fluid being measured, and the converted flow rate can be integrated by the following integrator $d$. This embodiment permits in this way to indicate the flow rate at the standard temperature or any other desired temperature by correcting the change in volume of the fluid being measured which is caused by the temperature to which the fluid is subjected.

Referring to FIG. 3, the embodiment shown in this figure also measures the flow rate sensed by flowmeter and corrects it in accordance with a physical conversion coefficient which is temperature-dependent as in FIG. 2. The embodiment incorporates a special arrangement for the arithmetic circuit $c$ shown in the block diagram of FIG. 1. In FIG. 3, reference numeral 7 denotes a shaper circuit which receives unit pulses $a$ in proportion to the flow rate or weight sensed by a flow meter, and reference numeral 8 denotes a flip-flop circuit connected to the shaper circuit 7 and also connected to a reference or preset counter II through an AND gate 10, the AND gate being also connected with an pulse generator 9. The reference counter II can count up to a preset value $N_o$ in a binary fashion and emit pulses not more than a set value $N_x$ which is commensurate with the correction quantity, and such emitted pulses are fed through a digital-to-analogue converter 12 to a comparator circuit 13. Reference numeral 14 denotes a resistance-voltage transducer which converts the unit quantity $b$, detected by the temperature-sensitive resistor element 1 as the correction to the flow rate or weight sensed by the flowmeter, into a voltage. Reference numeral 15 represents an amplifier connected to the transducer for conveying the correction quantity to the comparator 13. Reference numeral 16 denotes a flip-flop circuit which is operated by a pulse signal produced by the comparator 13 and the output side of the flip-flop 16 is connected to an AND gate 17 which has another input that is the same as the input to the reference counter II. Reference numeral 18 denotes a divider circuit having the function to perform the division $$\frac{N_0-N_x}{N_0} = 1 - \frac{N_x}{N_0}$$

and the divider is connected through a buffer 19 to an integrating meter $d$. Reference numeral 20 denotes an OR circuit.

In FIG. 3, there is provided another integrating meter $d'$ which is connected through a separate buffer 21 with the shaper circuit 7 directly to be operated by pulses which are not corrected. In operation, a unit pulse $a$ emitted by the flowmeter for each unit amount of the flow rate is passed through the shaper circuit 7 to set the flip-flop circuit 8 and to reset the other flip-flop circuit 16. The emitter 9 always generates a signal of say 30 kc./s. and when the flip-flop circuit 8 produces an output to open the gate 10, the signal from the emitter 9 is fed to the reference counter 11. Thus the AND gate 10 is opened by a pulse signal from the flowmeter.

The liquid temperature is detected by the temperature-sensitive resistor element 1 and is converted by the resistance-voltage transducer 14 into a voltage signal which is sufficiently amplified by the amplifier 15 to a voltage $E_t$ and is applied to the comparator circuit 13. The output voltage $E_d$ from the digital-to-analogue converter 12 which is driven by the reference counter 11 is also applied to the comparator 13, produces a signal. The value of $N_x$ to which the voltage $E_d$ is proportional is determined by $E_t$, since $E_d$ is controlled by $E_t$. In other words, the temperature sensed by the temperature-sensitive resistor element 1 determines the number of pulses $N_x$ passed from the reference counter 11. The output from the comparator 13 sets the flip-flop circuit 16 and coacts with the output from the AND gate 10 to open the AND gate 17, thereby allowing the output pulses to be fed to the divider circuit 18. Thus the divider circuit remains inoperative unless the AND gate 17 is opened by the output of the flip-flop circuit 16.

Then only that number of pulses which corresponds to the difference $(N_o-N_x)$ between the number of pulses to the reference counter II, $N_o$ and the number of pulses fed to the digital-to-analogue converter 12, $N_x$, are applied to the divider circuit 18. The number of pulses which are obtained at the output of the divider circuit, $N_r$, will then be represented by the relationship $$N_r = N \left(\frac{N_0-N_x}{N_0'}\right)$$

where $n_o'$ denotes the divisor and N the number of input unit pulses. The output pulses of the divider circuit are fed through the buffer 19 to operate the integrating meter $d$, which therefore can integrate the unit pulses which are corrected in accordance with the fluid temperature.

To give an example, assume $N_o=2048, N_x=204.8$ and $N_o'=2029$. Then $$N_r = N \frac{N_0-N_x}{N_0'} = \frac{2048-204.8}{2029} \quad N_r = 0.9048 \doteq 90\% N$$

Upon receipt of one thousand unit pulses from the flowmeter, the number of output pulses will be 1000×0.9=900, so that 10 percent correction has been made.

When pulses entering the reference counter 11 reaches 2048, since $N_o$ is constant, the counter generates a signal which resets the flip-flop circuit 8 to close the gate 10 to thereby interrupt the operation of the reference counter 11. Simultaneously, the same signal passes through the OR gate 20 to reset the flip-flop circuit 16, thereby closing the AND gate 17 and interrupting the operation of the divider circuit.

Such operation is repeated for each pulse from the flowmeter to perform the temperature compensation of the flow rate.

In this embodiment, a pulse sampling unit may be provided as required between the AND gate 17 and the divider circuit 18 so as to derive the quantity ($N_o - N_x$).

Then referring to FIG. 4, the embodiment shown is also directed to the measurement of a flow rate measurable with a flowmeter using a temperature-dependent physical correction coefficient. The arithmetic circuit C comprises a shaper circuit 7 which receives unit pulses $a$ in proportion to the flow rate or weight detected by the flowmeter. The shaper circuit 7 in this embodiment has the function of distributing shaped pulses to various units. Reference numeral 22 denotes an analogue-to-digital converter unit for converting a quantity $b$ as obtained by temperature-sensitive resistor element 1 through a temperature circuit 23 into a digital quantity. The converter is connected with a gate circuit 24 which is also connected with the shaper circuit 7. Each time the shaper circuit 7 delivers a pulse signal to the gate circuit 24, the latter opened to allow passage therethrough of the correction quantity from the digital-to-analogue converter 22 to the immediately following product forming circuit or adder/subtractor circuit 25. Reference numeral 26 denotes a circuitry which detects the instantaneous value of flow rate from the intervals between successive unit pulses distributed by the shaper circuit 7 for indication on a meter 27 and which functions as a gate for each increment, for example each one tenth of the total range of flow rate covered by the flowmeter to compensate for variation between instruments. Reference numeral 28 denotes a gate circuit which enables the compensation quantity for the instrument variation as derived by the circuitry 26 to be fed to the product forming or adder/subtractor circuit 25 for each pulse signal distributed from the shaper circuit 7. In use, the coefficient of cubical expansion of the fluid being measured is previously calculated or otherwise determined and its value is set in the analogue-to-digital converter 22 together with a reference temperature. These set values are used in combination with the fluid temperature, sensed by the the temperature-sensitive resistor element 1 and developed by the thermometer 23, to derive a digital output $b$ from the relationship between volume and temperature. On the other hand, a pulse signal $a$ developed by the flowmeter is distributed by the shaper circuit 7 into a number of pulses. One of the pulses enters the gate circuit 24 to open it each time the pulse enters, thereby allowing the output $b$ to be fed to the product forming or adder/subtractor circuit 25. Another pulse enters the circuitry 26 for compensation of instrument variation and through detection of flow rate per unit time, establishes a compensation quantity for the flow rate or for each one tenth of the total range of flow rate, while opening the gate circuit 28 to feed the following product forming or adder/subtractor circuit 25. The indicator 27 provides a digital or analogue indication of the quantity as detected by the circuitry 26. The product forming or adder/subtractor circuit 25 performs the temperature compensation for each unit pulse of the flow rate, and the corrected quantity is integrated by the integrator $d$.

In this embodiment, the shaped pulse distributed by the shaper circuit 7 may be directly applied to an integrator $d'$ for permitting the measurement in the event that the arithmetic circuit $c$ should fail to operate. Additionally, the integrator $d'$ may be a batch-type integrator. It is also possible to connect both integrators $d$ and $d'$ to a printer 30 through a distributor 29 so that the information concerning the measured quantity may be printed at any desired time by operation of a pushbutton. While the invention has been particularly described with reference to the embodiment illustrated, it should be obvious that the invention is not limited to these embodiments, but is applicable to other equivalent examples. Any quantity such as volume, weight or other detectable quantity may be used as an input pulse according to the invention. Any correction factor may be used which has a correlation or functional relationship with the unit amount of a quantity being measured. Since the correction is effected for each unit pulse, the integration advantageously maintains an increased accuracy irrespective of the quantity to be measured.

What we claim is:

1. A system for correcting unit values of a measured quantity by a correction factor, comprising, in combination, means for measuring consecutive unit values of a quantity; means for generating a first pulse sequence comprising first pulses, each of said first pulses representing a predetermined part of each of said measured consecutive unit values of said quantity; means for furnishing a correction signal having a predetermined characteristic value corresponding to said correction factor and scaled in correspondence to the number of pulses in said first pulse sequence representing a unit value of said quantity; counting means connected to said means for generating a first pulse sequence, for counting said first pulses and furnishing a reference counting signal following receipt of a predetermined number of said first pulses; and subtraction circuit means, including gating means, connected to said counting means, said means for generating a first pulse sequence and said means for furnishing a correction signal for subtracting from said first pulse sequence for each of said reference counting signals a number of pulses corresponding to said characteristic value of said correction signal whereby a modified third pulse sequence corresponding to corrected values of said measured quantity is obtained 2. A system as set forth in claim 1 further comprising integrator means for integrating said third pulse sequence.

3. A system as set forth in claim 2, wherein said correction factor is a function of a second quantity; and wherein said means for furnishing a correction signal comprise means for measuring said second quantity and transducing means for transducing the measured value of said second quantity into said correction signal.

4. A system as set forth in claim 3, wherein said correction signal comprises a sequence of pulses having a repetition rate corresponding to the measured value of said second quantity; wherein said characteristic value is said repetition rate; wherein said counting means comprise a preset counter having a counter input and a counter output and adapted to furnish said reference counting signal upon receipt of a predetermined number of pulses at said counter input; means for applying said first pulse sequence to said counter input; said gating means have a first and second gating input and a gating output; means connecting said counter output to said first gating input; means connecting the output of said transducing means to said second gating input; wherein said subtraction circuit means comprise a subtraction circuit having a first and second subtraction input and a subtraction output; further comprising means for applying said first pulse sequence to said first subtraction input; means connecting said gating output to said second subtraction input; and means connecting said subtraction output to the input of said integrator means.

5. A system as set forth in claim 4, wherein said measuring means furnish unit pulses for each measured unit value of said quantity; and wherein said means for furnishing a first pulse sequence comprise pulse scaler means for furnishing a plurality of first pulses in response to each of said unit pulses.

6. A system as set forth in claim 2, further comprising printing means connected to said integrator means for allowing print out of the output of said integrator means at selected time periods.

7. A system as set forth in claim 3, wherein said correction signal is an analog signal having a magnitude corresponding to said correction factor; wherein said counting means have a counting input and a first and second counting output, pulses applied at said counting input causing a corresponding counting signal to be furnished at said first counting output, said reference counting signal appearing at said second counting output when the number of pulses applied at said counting input equal $n_o$; wherein said measuring means furnishes a unit pulse for each measured unit value of said measured quantity; and wherein said subtraction means comprise digital-analog converter means converting said corresponding counting signal to a corresponding analog signal, comparator means comparing said corresponding analog signal and said correction signal and furnishing a comparison signal when said corresponding analog signal and said correction signal have a predetermined relationship, and wherein said gating means transmit said first pulse sequence in response to said comparison signal and until receipt of said reference counting signal, and impede the transmission of said first pulse sequence upon receipt of each unit pulse until receipt of the subsequent comparison signals, whereby the so-transmitted first pulses constitute said third pulse sequence.

8. A system as set forth in claim 7, wherein said gating means comprise first flip-flop means having a first input connected to said unit pulses and a second input connected to said second counting output, and a first flip-flop output; fixed repetition rate pulse generator means; first AND gate means having a first input connected to said first flip-flop output, a second input connected to said fixed repetition rate pulse generator means, and an AND gate output; second flip-flop means having a said input connected to output of said comparator means and a reset input connected to said second counting output and said measuring means and having a said output; and second AND gate means having a first input connected to said output of said first AND gate, a second input connected to said output of said second flip-flop means and a second AND gate output furnishing said third pulse sequence.

9. A system as set forth in claim 8 further comprising divider means connected to said second AND gate output for dividing said AND gate output by $N_o'$.

10. A system as set forth in claim 9, further comprising a pulse sampling unit arranged between said second AND gate output and said divider means.

11. A system as set forth in claim 2, further comprising additional integrator means connected to said means for measuring consecutive unit values of a quantity, for integrating said first pulse sequence and furnishing an indication of the so-intergrated value.

12. A system as set forth in claim 1, wherein said measure quantity is fluid flow; and wherein said correction factor comprises a factor for adjusting fluid flow to a standard temperature 13. A system as set forth in claim 1, further comprising means for furnishing a second correction signal corresponding to a second correction factor; and means for connecting said second correction signal to said subtraction circuit means.

14. A system as set forth in claim 13, further comprising intergrator indicating means connected to said means for furnishing a second correction signal, for indicating the total correction corresponding to said correction signal.

15. A system as set forth in claim 13, wherein said second correction signal is a signal for correcting individual instrument variations in said means for measuring consecutive unit values of a quantity.